United States Patent [19]

Sohre

[11] E Re. 29,128

[45] Reissued Feb. 1, 1977

[54] VANELESS SUPERSONIC NOZZLE

[76] Inventor: John S. Sohre, One Lake View Circle, Beaver Lake, Ware, Mass. 01082

[22] Filed: Jan. 15, 1976

[21] Appl. No.: 649,478

Related U.S. Patent Documents

Reissue of:

[64] Patent No.: 3,804,335
Issued: Apr. 16, 1974
Appl. No.: 3,62,,403
Filed: May 21, 1973

[52] U.S. Cl. ..... 239/289; 239/553.5; 415/119; 415/181

[51] Int. Cl.[2] ..... B05B 1/34; F01D 1/02

[58] Field of Search ..... 239/76, 289, 533, 536, 239/548, 553, 553.5, 590.5, 593, 595; 181/33 P; 415/119, 181, 183, 208

[56] References Cited

UNITED STATES PATENTS

| | | | |
|---|---|---|---|
| 2,258,793 | 10/1941 | New | 415/181 X |
| 2,378,372 | 6/1945 | Whittle | 415/181 X |
| 2,702,157 | 2/1955 | Stalker | 415/181 X |
| 2,839,239 | 6/1958 | Stalker | 415/181 |
| 2,953,295 | 9/1960 | Stalker | 415/181 |
| 3,744,724 | 7/1973 | Caille | 239/553.5 |

FOREIGN PATENTS OR APPLICATIONS

| | | | |
|---|---|---|---|
| 342,289 | 1/1931 | United Kingdom | 415/119 |
| 615,219 | 1/1949 | United Kingdom | 415/119 |

*Primary Examiner*—Robert S. Ward, Jr.

[57] ABSTRACT

A converging-diverging nozzle unit for supersonic expansion in turbines is presented wherein a plurality of converging nozzle segments open into a common diverging chamber at or near the throat of the converging nozzles. Convergence and divergence may occur in different directions in the nozzle unit; with reference to a rotating turbine wheel, convergence occurs in a direction substantially tangential with respect thereto, and divergence occurs substantially radial with respect thereto.

38 Claims, 15 Drawing Figures

VANELESS SUPERSONIC NOZZLE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the field of turbomachinery. More particularly, this invention relates to the field of convergent-divergent nozzle structure for creation and expansion of supersonic flow of a Compressible fluid for turbine motive fluid.

2. Description of the Prior Art

Converging-diverging nozzles are needed to create and expand a supersonic stream (at pressure ratios exceeding approximately 1.85) to transform a high energy stream into a high velocity jet with good efficiency and minimal shock, flow separation, or jet deflection.

Supersonic shock fronts and jet deflection at pressure ratios above design level, and expansion-compression shock and flow separation at pressure ratios below design level are particular problems in accomplishing the desired supersonic expansion in turbine machinery, and these problems have several undesirable consequences, including dissipation of available energy, unstable flow conditions, inefficient operation, and imposition of vibratory stress on the associated rotating turbine blade structure leading to damage thereof. The problem of vibratory stress of the blade structure is a particularly serious problem.

Flow separation results in strong, wide wakes at the nozzle exit, resulting in overall poor efficiency, pressure fluctuations and vibratory loading on the rotating turbine blade structure. Exit edge failures of the nozzles have also been encountered.

Jet deflection is a problem particularly associated with pressure ratios above design level, and thus there is a direct relationship between jet deflection and Mach number. Pressure ratio refers, of course, to the ratio of the pressure at the inlet of the nozzle to the pressure in the area into which the nozzle discharges, commonly referred to as the back pressure. The exit angle of the fluid from the nozzles is also related to and affected by the pressure ratio. The exit angle is the acute angle of the axis of the flow stream with the exit plane of the nozzles. A turbine is typically designed to operate at a particular pressure ratio and exit angle; and increases in the pressure ratio will cause a deflection of the nozzle jet in a direction to increase the exit angle. This jet deflection can result in shock waves, expansion waves, and pressure gradients with resultant stresses on the buckets, i.e., the rotating turbine blades. As a result, blade failures can occur, axial thrust on the rotating structure can increase and fluctuate unpredictably, and an overall highly inefficient operation results.

Jet deflection also results in an adverse effect on entry of the jet stream into the bucket passages. The cross-sectional area of the jet stream entering the buckets is a direct function of the nozzle exit angle. Jet deflection from increased pressure ratio operation results in an increase in the cross-sectional area of the jet stream entering a bucket passage, and the buckets will not function properly if the cross-sectional area of the entering stream exceeds a design multiple of the throat area of the bucket passage.

Conventional nozzles for convergent-divergent supersonic expansion are of two general types. One type has convergent-divergent profiles machined into opposed side surfaces of adjacent nozzles so as to define, in one dimension, convergent-divergent passages between these profiled side surfaces. The top and bottom surfaces of such passages are parallel to each other to define a constant height for the convergent-divergent passage or the height may vary linear between nozzle inlet and exit. The other type of conventional nozzle is in the form of round nozzle passages, as used in drilled and reamed nozzle blocks. These nozzle blocks may be circular in cross-section and thus two-dimensionally convergent-divergent. In any case, the divergence and the throat of the passage are not defined by the inner and outer circumferential walls of the passage.

Both of the above discussed general types of convergent-divergent divergent nozzles do, however, encounter the several problems of jet separation, jet deflection and vibratory excitation damage to turbine blades. These standard nozzle structures usually have a very small spacing from the associated rotating blades; usually on the order of about one-sixteenth of an inch. Any shock waves which occur in the expanding fluid stream must either be dissipated in that narrow space or else the rotating airfoils are buffeted. Since most of such shocks cannot be dissipated in that small space, a great deal of such undesirable buffeting does occur.

Conventional convergent-divergent airfoil-type nozzles also experience flow interruptions at the discharge plane because of the physical fact that there must be some spacing ("trailing edges") between adjacent flow paths. This flow interruption also reduces efficiency.

Conventional convergent-divergent nozzle configurations also present a capacity-size problem. In the one dimensional profiled nozzles increased capacity is achieved by increasing the width, i.e., by widening the spacing, between contoured surfaces, thus increasing the dimension tangential with respect to the turbine wheel. In the round nozzles, increased capacity is achieved by enlarging the contoured circular passages, thus also increasing the tangential dimension. Accordingly, increased capacity invariably results in increased circumferential size of the turbomachinery, a result which is often very undesirable, or which may result in excessive tip-speeds.

SUMMARY OF THE INVENTION

The present invention overcomes or reduces the above discussed and other problems of the prior art with its significantly improved and novel nozzle unit. The nozzle unit configuration of the present invention provides a common expansion chamber in conjunction with a plurality of converging nozzle segments. The individual diverging passages of conventional converging-diverging nozzles are eliminated and, in their place, a common expansion chamber is provided. The individual converging nozzle segments are connected at or near their throats to the common expansion chamber so that the steam or other turbine propulsive fluid undergoes expansion to the velocity of sound (Mach 1) in the converging portions of the individual nozzle segments and is then delivered to the common chamber for supersonic expansion to the final nozzle exit pressure. The common expansion chamber is a diverging chamber, but its direction of divergence may be angled, preferably at 90°, with respect to the direction of convergence of the individual converging nozzle passages. Generally speaking, and with reference to the direction of rotation of the rotating turbine buckets, subsonic expansion is in a direction substantially tangential to the turbine wheel and supersonic expansion utilizes space in a substantially radial direction. Thus, convergence and divergence in the nozzle occur in different directions with respect to the direction of flow through the nozzle.

If desired, a "deflection control wall" or, a series of such walls, can be incorporated in the common expansion chamber, inclined in a direction parallel to or substantially parallel to the axis of the desired jet flow at design conditions, and hence inclined oppositely to the direction of jet deflection normally experienced at increased pressure ratios. This deflection control surface will function to prevent the normal jet deflection usually encountered at pressure ratios above the design point and will force the gas to expand and flow in the general direction for design conditions. Thus, the usually experienced jet deflection with its attendant inefficiencies and other problems can be eliminated. Also, and quite significantly, the bucket entry angle and cross-sectional area of the entry stream will actually decrease, thus enabling the buckets to function properly over a wider range of conditions and without an increase of stage reaction (pressure drop across the buckets).

If desired, the individual nozzle segments can be extended into the common expansion chamber to provide a better defined throat and thus a more efficient configuration. However, the major supersonic expansion is still accomplished by the increase in the radial dimension of the common expansion chamber in accordance with the general concept of the invention.

The nozzle configuration of the present invention with its common expansion chamber provides several important advantages over the prior art. The amount of circumferential space and size required to handle a given amount of steam is reduced, and, similarly, the size increase needed to accommodate an increased volume is reduced, because the expansion is accomplished in the direction of the height of the nozzles, i.e., radial inward and/or outward with respect to the turbine wheel, rather than in the width separating the nozzles or in the circular configuration of the round nozzles. Accordingly, turbines incorporating the present invention can pass more steam at higher pressure ratios for a given arc of circumference than in the prior art, and as a result high volumes can be handled at greater pressure ratios than presently obtainable. Also, machines can be built with fewer stages and thus can be smaller and lighter. Overall operating efficiency is greatly improved because flow interruptions are greatly reduced or eliminated, and force fluctuations on the buckets are reduced by virtue of the expansion which takes place in the common passage thereby dissipating wakes and shock effects. It is important to note that the common expansion passages provide a separation between the individual nozzle elements and the buckets much greater than the usual separation of approximately 1/16 inch to ⅛ inch found in typical prior art turbines. By judicious selection of the location of the trailing edge of the nozzles, a large common expansion passage can be generated which is completely free of supersonic shock. Accordingly, efficiency is increased and problems of blade stress, bucket vibratory stress excitation and axial rotor thrust loading are reduced significantly.

Important economic improvements also result from the present invention. Specifically, manufacturing costs can be substantially reduced since conventional subsonic profiles can be used for the converging portions of the nozzles. Also, a high degree of standardization and mass production can be accomplished since nozzle blocks of the converging nozzles can be manufactured and stocked irrespective of the pressure-ratio for which they are to be used, and the diverging common expansion chamber can be machined or otherwise formed at some later time, such as at assembly of the final machine, to accommodate the desired expansion ratio of each individual machine. This eliminates individual engineering, drafting and manufacturing of the nozzle blocks.

The common expansion chamber and the radial expansion configuration of the present invention can also be incorporated in the rotating bucket structure of certain turbines. This may be done where supersonic expansion is desirable to achieve high horsepower output from a minimum number of turbine wheels.

Accordingly, one object of the present invention is to provide a novel and improved convergent-divergent nozzle structure for a turbine.

Another object of the present invention is to provide a novel and improved convergent-divergent nozzle unit for a turbine wherein a plurality of nozzles have a common diverging expansion chamber.

Another object of the present invention is to provide a novel and improved convergent-divergent nozzle unit for a turbine wherein convergence and divergence take place in different directions with respect to the direction of flow through the nozzle.

Still another object of the present invention is to provide a novel and improved convergent-divergent nozzle structure for turbines wherein problems of jet deflection, jet separation, vibratory loading and loss of efficiency, commonly encountered in many prior art turbines, are significantly reduced.

Still another object of the present invention is to provide a novel and improved convergent-divergent bucket structure for rotating turbine wheels.

Other objects and advantages will be apparent to and understood by those skilled in the art from the following detailed drawings and description.

BRIEF DESCRIPTION OF THE DRAWINGS

Referring now to the drawings, wherein like elements are numbered alike in the several figures.

DESCRIPTION OF THE PREFERRED EMBODIMENT

Figure 1:
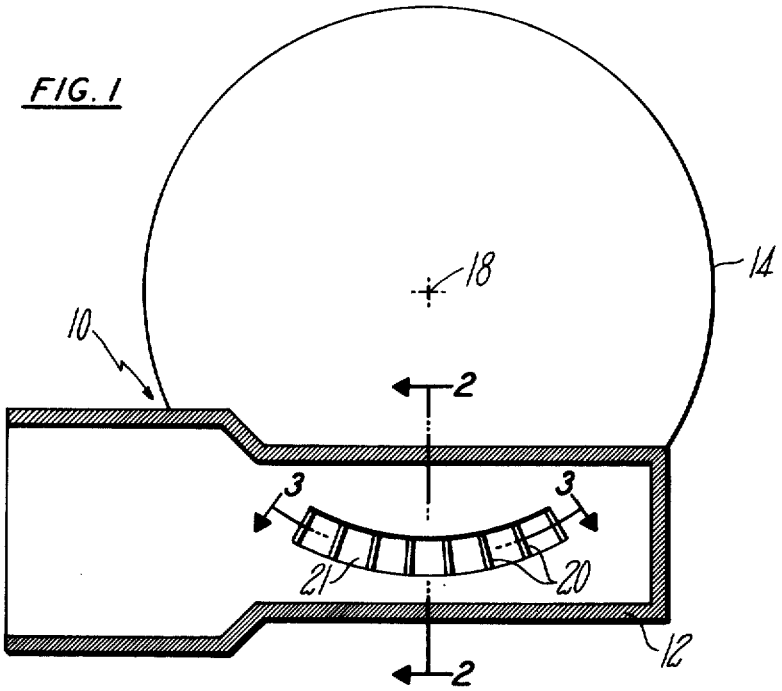
FIG. 1 is a generalized showing, partly in section, of a turbomachine and motive fluid entry passageway.
Figure 2:
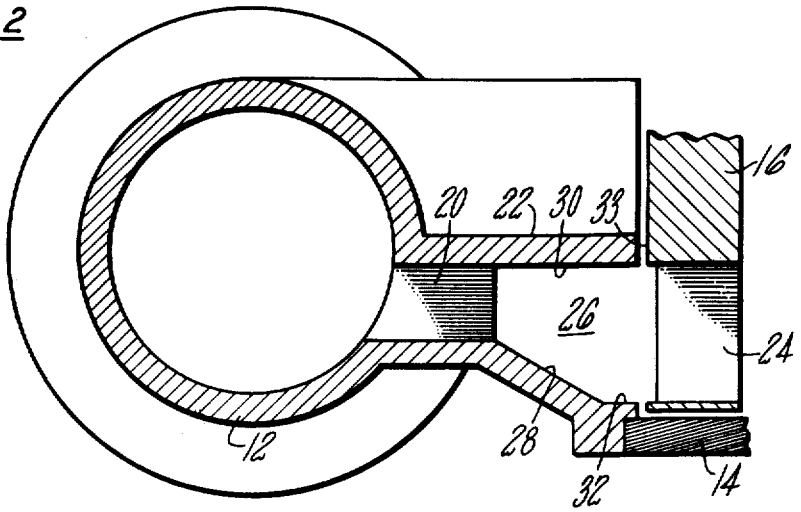
FIG. 2 is a view taken along line 2—2 of FIG. 1 showing an elevation view of the supersonic convergent-divergent nozzle unit of the present invention as applied to stationary nozzles.

Referring now to FIGS. 1 and 2, the general environment of the present invention is shown in the nature of a turbomachinery unit 10. Turbomachinery unit 10 has an inlet chamber 12 to deliver steam or other motive fluid to the unit and a turbine casing 14 for housing a rotating turbine wheel 16 which is mounted for rotation about an axis 18. Many other elements and details normally found in turbomachinery units are unnecessary to a proper understanding of the present invention, and thus these other details have been omitted from the simplified environment shown in FIGS. 1 and 2.

Inlet chamber 12 is a flow communication with an array of nozzle segments 20 which are arranged in an arcuate array on an arc corresponding to the radius of the blades or buckets 24 of turbine 16 with respect to axis 18. The individual nozzle segments 20 form part of a convergent-divergent nozzle unit 22 which serves to direct the steam or the motive fluid from inlet chamber 12 to the blades or buckets 24 of turbine wheel 16. Convergent-divergent nozzle unit 22 is comprised of the individual nozzle segments 20 which cooperate with each other to form a plurality of convergent flow paths 21, and a common diverging expansion chamber 26 which is in flow communication with the convergent paths 21 between the nozzles 20. The steam or other motive fluid flows through inlet chamber 12 into the convergent flow paths between adjacent nozzles 20, and that flow may, if desired, be regulated by appropriate control valving. The motive fluid is subsonically expanded in traversing the converging passageways between adjacent nozzles, and it is then supersonically expanded in chamber 26 and then delivered to the buckets 24 to drive turbine wheel 16.

Figure 3:
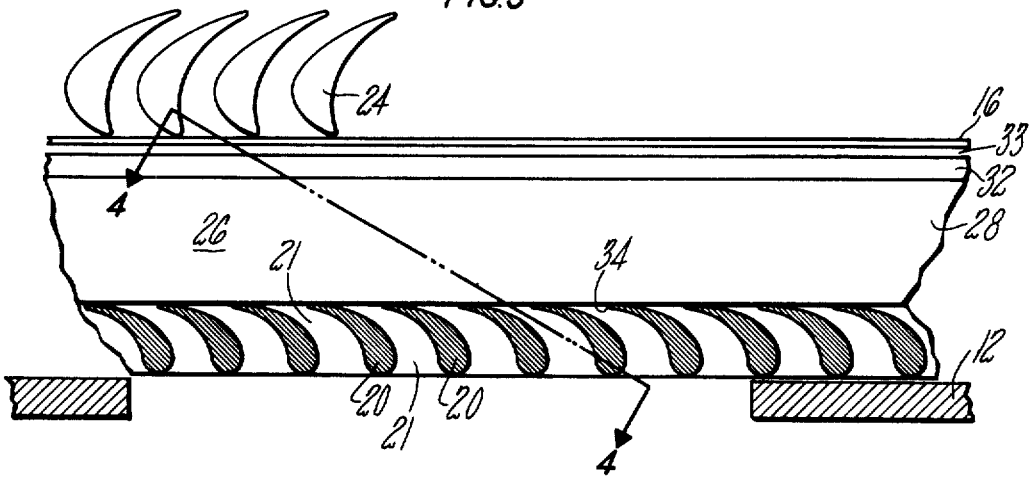
FIG. 3 is a view taken along line 3—3 of FIG. 1 showing an arc of nozzles with their common expansion chamber in accordance with the present invention.

As can be seen from a combined consideration of FIGS. 1, 2, 3 and 4, the width between adjacent nozzles 20 diminishes, and hence the passageways 21 converge, in a direction generally tangential with respect to turbine wheel 16. The radial height of vanes 20, i.e., the dimension in a direction along a radius of turbine wheel 16 is defined by separation between the left portions of walls 28 and 30, and that radial height is shown constant in FIG. 2 (although it could be varied if desired). Conversely, of that part of the walls 28 and 30 which define chamber 26, at least one of those walls, i.e., the right portion of wall 28 in FIG. 2, is inclined with respect to a radius of the turbine wheel so that chamber 26 can be said to expand radially with respect to the turbine wheel. Of course, wall 30 could, if desired, also be inclined so that chamber 26 would expand both toward axis 18 as well as in the direction away from axis 18. Wall 28 terminates in a segment 32 which is perpendicular with respect to the radius of wheel 16, and section 32 cooperates with a similar length of wall 28 to form a nozzle exit passage with an exit edge 33 immediately adjacent to the rotating wheel 16 and blades 24. Of course, it should be kept in mind that the nozzles 20 are arranged in an arcuate array, and that walls 28 and 30 are similarly arcuate to conform with the annular array of turbine blades 24. Referring now to FIG. 3, a view of the nozzle unit is presented taken along 3—3 of FIG. 1. The array of individual nozzles 20 forming converging flow paths 21 therebetween can be seen, and these converging flow paths 21 are seen communicating with the common expansion chamber 26. A throat 34 is defined in each passage 21 at the plane of smallest cross-section area of the passage, and the throat 34 of each convergent passage 21 communicates directly with the common expansion chamber 26. The width of flow passages 21 is defined by the separation between adjacent nozzles, and the height of flow passages 21 is defined by the separation between the left portion of walls 28 and 30.

Referring collectively to FIGS. 1–4, the necessary convergent-divergent structure is present in nozzle unit 22 for supersonic expansion of a compressible medium. The steam flows through inlet chamber 12 and then into convergent passageways 21 defined by the confronting walls of adjacent nozzle segments 20. The throats of passageways 21 are connected to expansion chamber 26, and the fluid in each of the passageways is delivered into the common diverging expansion chamber which, as indicated above, expands in a direction angled, preferably perpendicular with respect to the direction of convergence effected by nozzle segments 20. Stated in another way, convergence and divergence in the nozzle occur in different directions, preferably mutually perpendicular directions, with respect to the direction of flow through the nozzle, or it can be said that planes extending in the direction of convergence and divergence intersect at approximately 90°.

Figure 4:
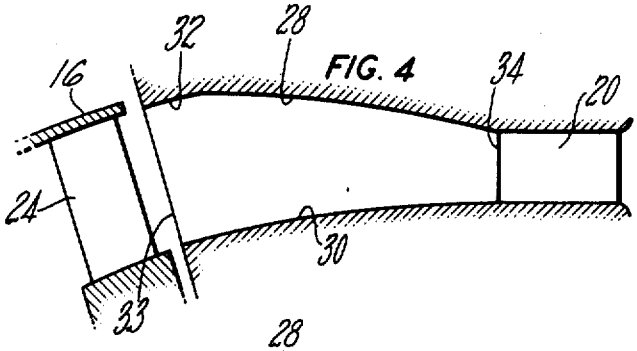
FIG. 4 is a view taken along line 4—4 of FIG. 3.

As indicated above, conventional convergent-divergent nozzle configurations typically terminate close to the associated blades, the separation usually being somewhere on the order of about 1/16 to ⅛ of an inch. By way of significant distinction, nozzle segments 20 terminate a substantial distance from turbine blades 24. While that distance will, of course, vary for different designs, it will typically be on the order of several inches, such as from ½ to 10 or more inches, so that chamber 26 is of substantial length normal to turbine wheel 16. The radially expanding nature of chamber 26 provides the necessary volume to accommodate the superonic expansion of the fluid being discharged from each of the passageways 21 to transform the high energy levels of the fluid into a high-velocity jet for delivery to the turbine buckets 24. Since the trailing edges of the nozzles may be located in a subsonic region, this will eliminate all supersonic shock waves in the entire supersonic expansion passage 26. The length of chamber 26 provides a long vaneless passage in which the superonic expansion is taking place, and this vaneless passage accomplishes flow adjustment and dissipation of wakes, shock waves, expansion waves and pressure gradients, thereby significantly improving the overall efficiency of the machinery and significantly reducing the problems of vibratory loading, blade and nozzle failures and rotor thrust loading which have accompanied jet deflection and flow separation in the prior art. The problems previously encountered with flow interruption are also reduced or eliminated since the long vaneless passage 26 produces a substantially uniform continuous combined flow stream for delivery to the buckets 24. The walls 28 and 30 appear to be curved as seen in FIG. 4 because of the location of line 4–4 in FIG. 3.

Figure 5:
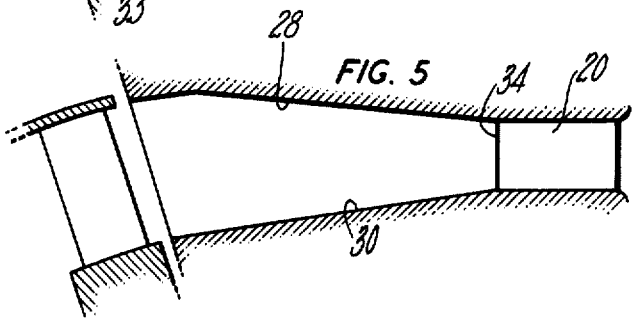
FIG. 5 is a view similar to FIG. 4 showing a modified wall configuration.
Figure 5A:
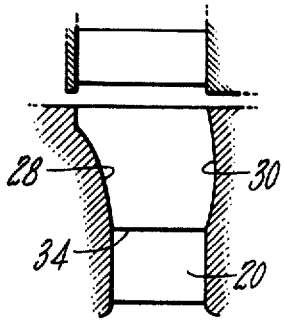
FIG. 5A is a cross-sectional view similar to part of FIG. 2 showing the wall contours in the modified configuration of FIG. 5.

Referring now to FIGS. 5 and 5A, a modified configuration is shown wherein walls 28 and 30 are slightly curved as seen in FIG. 5A, thus resulting in an apparently straight configuration when viewed as in FIG. 5. This modified shape has "Prandtl corners" at the junctions of walls 28 and 30 with throat 34. These are sometimes considered desirable because they illustrates the exact point of onset of supersonic expansion. Other configurations can be obtained in a similar manner. This example illustrated the capability of the invention to accommodate a wide range of thermodynamic requirements with only minor changes of hardware configuration. A wide variety of conditions can thus be accommodated without a change in nozzle segments 20.

Figure 6:
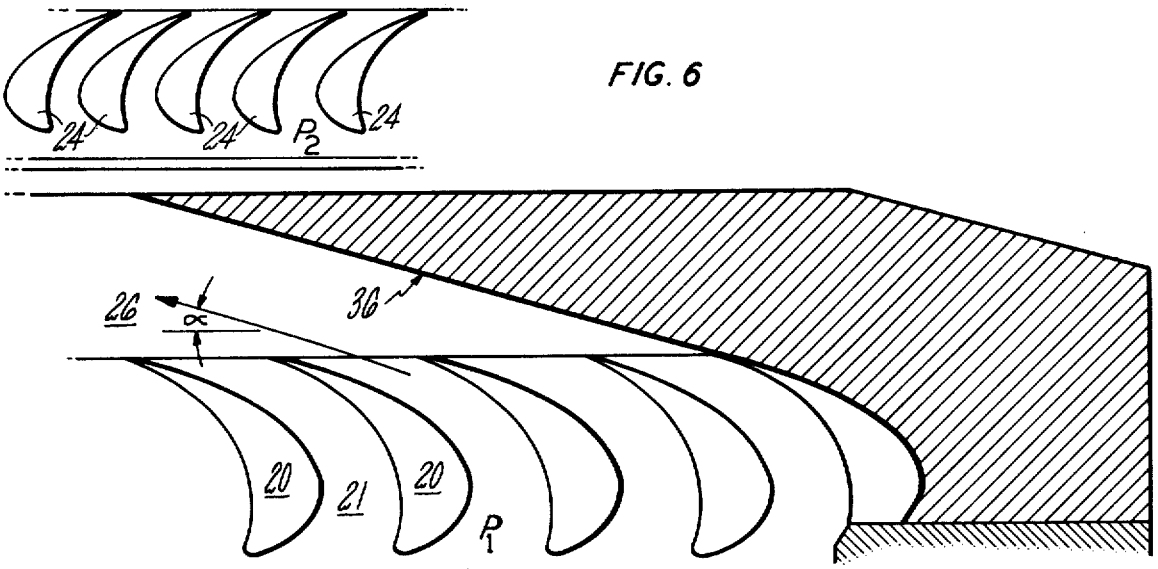
FIG. 6 is a view similar to FIG. 3 showing a modified version of the invention incorporating backup wall.

Referring now to FIG. 6, a view similar to FIG. 3 is shown incorporating a modification in the form of a backup deflection control wall 36 in the common expansion chamber 26. Wall 36 functions to control jet deflection at pressure ratios above design level. The angle $\alpha$ shown in FIG. 6 represents the angle between the flow axis of a discharge stream from a passage 21 and the discharge plane from the nozzles. With prior art nozzle configurations, an increase in the pressure ratio $P_1/P_2$ would result in an increase in the angle $\alpha$ with attendant shock wave and flow separation development leading to inefficient operation at off design conditions. With the presence of backup wall 36, a reduction in $P_2$ (thus resulting in an increase in the ratio of $P_1/P_2$) results in wall 36 functioning to produce a decrease in angle $\alpha$ at the end of the steam-jet removed from wall 36, so that the discharge from nozzles 20 fills the volume which is available in the diverging chamber 26. This reduction in angle $\alpha$ is directly opposite to the effect normally encountered and may be termed a negative deflection; it results from the fact that the presence of backup wall 36 prevents the normal jet deflection and forces the gas to expand in the opposite direction to decrease angle $\alpha$. Since the angle $\alpha$ thus adjusts as a function of the ratio $P_1/P_2$ in a direction opposite to that previously encountered, the commonly experienced shock and flow separation problems are avoided or reduced for off design conditions, and thus the nozzle unit of the present invention results in a significant improvement in nozzle efficiency.

Figure 6A:
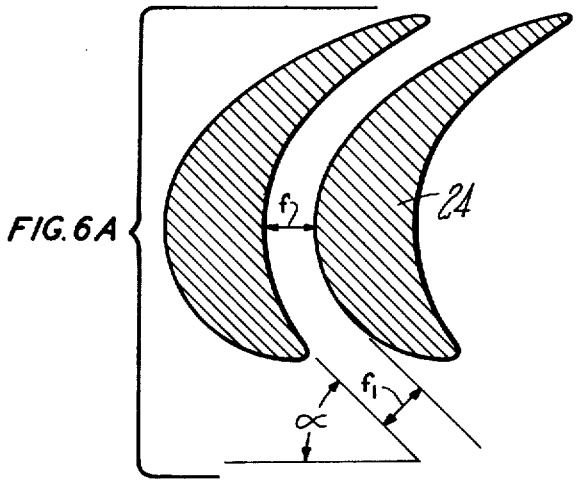
FIG. 6A is a view showing part of FIG. 6 in detail.

Referring both to FIGS. 6 and 6A, another very significant advantage of the modified configuration incorporating backup wall 36 is shown. A major problem heretofor encountered in supersonic backup entry relates to a relationship between the area $f_1$ of the entering stream (determined in the plane normal to the direction of the flow stream from the nozzle discharge to the bucket) and the cross-sectional area f of the flow passage between adjacent buckets. If the ratio $f_1/f$ exceeds a certain level, the bucket will not function properly. As can be seen in FIG. 6A, an increase in $\alpha$, a condition normally encountered in the prior art, results in an increase in $f_1$, and the buckets will not function properly (or "choke") if that increase becomes excessive. With the presence of backup wall 36, an increase in $P_1/P_2$ (with its attendant increase in Mach number) will result in a reduction in $\alpha$ and thus a reduction in $f_1$. Accordingly, the buckets can continue to function properly without the generation of a reaction pressure drop and/or choking over a much wider range of Mach number and pressure ratio conditions than heretofore possible.

While only one backup wall is shown in FIG. 6, it will be understood that a plurality of such backup walls can be incorporated, distributed periodically or aperiodically along the nozzle array. Up to as many as one backup wall for each two nozzles can be used, in which event there would be a backup wall extending from every other nozzle toward the buckets.

Figure 7:
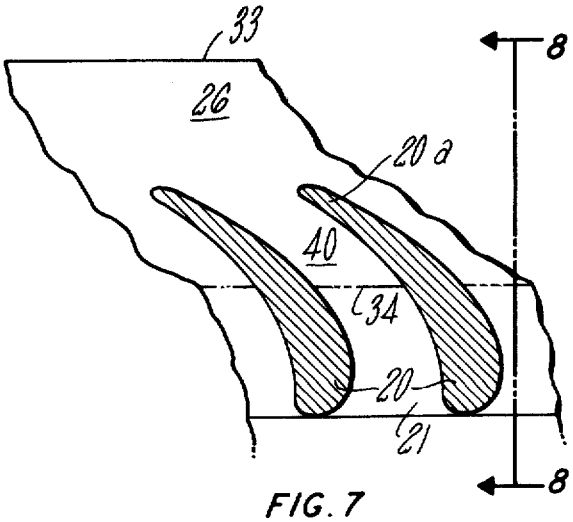
FIG. 7 is a partial view similar to FIG. 3 showing another modification of the present invention wherein vane elements extend into the common expansion chamber.
Figure 8:
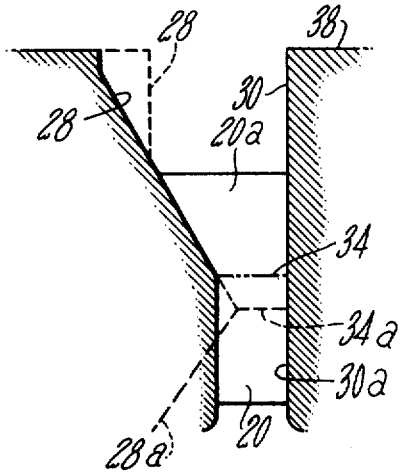
FIG. 8 is a view along line 8—8 of FIG. 7.

Referring now to FIGS. 7 and 8, still another modification of the present invention is shown. In this modification the trailing edges 20(a) of the nozzles 20 are continued beyond throat 34 into divergent chamber 26, and they may extend partway into the chamber. The passage 40 formed between the trailing edges may be parallel sided, converging or diverging, straight or curved. In any of these events, and as can best be seen in FIG. 8, the major part of total divergence, and hence gas expansion, between throat 34 and exit edge 38 is still accomplished in the radial direction by the presence of sloping wall 28, and the passage throat is also defined by walls 28 and/or 30. Of course, as previously indicated, wall 30 can also be sloping in the direction opposite to the slope of wall 28. The extension of trailing edges 20(a) into the common radially extending expansion chamber 26 provides a somewhat better defined throat for the passageways 21 thus contributing to increased efficiency. As pointed out above, it will, however, still be noted that the major expansion in chamber 26 still occurs in a direction perpendicular to the passage formed by the nozzle-profiles 20 from the entry of the nozzles to throat 34.

Figure 12:
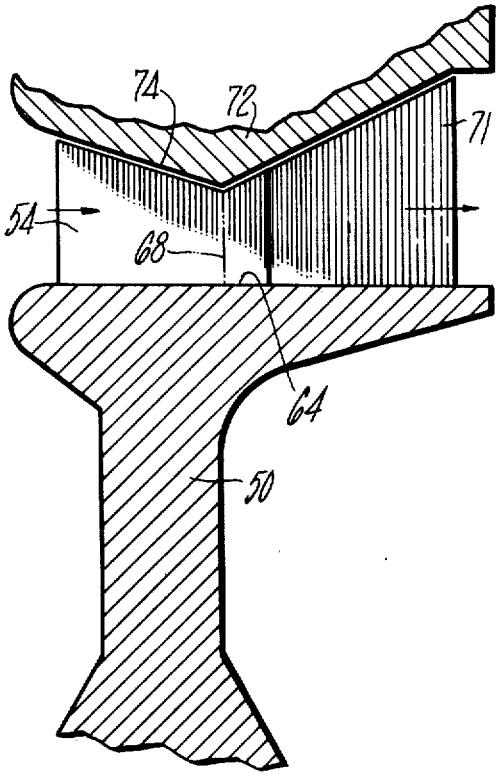
FIG. 12 is a view along line 12—12 of FIG. 11 showing an enlarged and modified partial view similar to FIG. 9.

As is discussed in more detail with regard to FIG. 12, the location of the throat, i.e., the smallest cross-sectional flow area, can be defined by contouring one or both of the wall segments 28(a) and 30(a) upstream of the throat. In this manner the throat, indicated at 34(a) in FIG. 8, can be defined in the radial plane with respect to the turbine wheel by varying the passage walls upstream of the throat rather than by varying the separation between the vanes is now done in the art. This wall contouring to define the throat is shown in the dotted lines in FIG. 8, but it will be understood it can be incorporated in any of the embodiments of the invention.

Still referring to FIG. 8, total supersonic expansion can be adjusted and determined by varying the height of the expansion chamber, i.e., by varying the distance between walls 28 and 30. As seen in FIG. 8, the contouring of wall 28 in the solid line will result in one expansion ratio, while contouring of wall 28 in the dotted line will result in a different expansion ratio. Thus, the present invention makes it possible to vary expansion ratios by varying the height of the expansion chamber rather than by varying the separation between nozzles as is presently done in the art. It thus becomes possible with the present invention to stock standard nozzle blocks and use those standard nozzle blocks in installations where different expansion ratios are required and are realized by contouring the radial height of the expansion chamber. This ability to use standard nozzle blocks in installations of different expansion ratios is a very significant economic advantage since it greatly reduces the cost experienced in the prior art of customizing nozzle blocks.

In all of the embodiments of the invention discussed above, higher efficiencies can be realized than in the prior art, and many of the prior art problems of jet deflection, flow separation, flow interruption, vibratory stressing and blade damage can be significantly reduced, especially for off design conditions. In addition, much less circumferential space is required so that more power can be produced in less space because the direction of nozzle height, i.e., the radial direction with respect to the turbine wheel, is used to accomplish the supersonic expansion. Accordingly, the design of the present invention can handle more steam at higher pressure ratios for a given arc of circumference of the turbine wheel than heretofor possible. Significant economies can be realized in that conventional subsonic profiles can be used for the nozzle segments 20, and finished blocks of such nozzles can be premanufactured and stocked with the diverging chamber 26 being machined or otherwise formed at assembly to accommodate the expansion ratio of each individual machine. Thus, individual engineering, drafting and manufacturing of each nozzle block can be eliminated.

Figure 9:
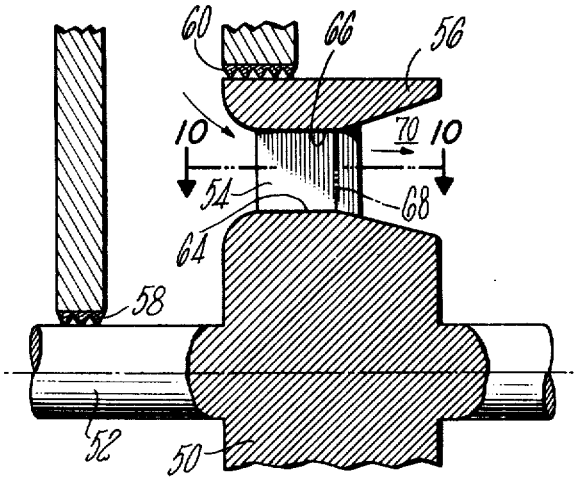
FIG. 9 is a view showing the common expansion chamber of the present invention incorporated in the rotating buckets of a reaction turbine wheel.
Figure 10:
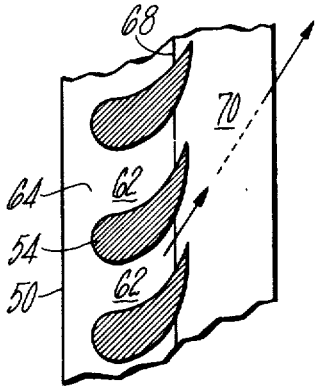
FIG. 10 is a view along line 10—10 of FIG. 9.

Referring now to FIGS. 9 and 10, the present invention is shown incorporated in the rotating wheel of a pure reaction turbine which has no stationary nozzles. The turbine wheel 50 is mounted for rotation on a shaft 52 and it carries an annular array of spaced buckets 54. The buckets 54 are rotated in wheel 50 at their inner ends, and the outer ends of the buckets are joined to a common annular shroud 56 which forms part of the rotating assembly. Shaft 52 and shroud 56 are sealed by appropriate seals 58 and 60, respectively, so high pressure steam or other motive fluid can be delivered to and expanded through the buckets in the flow direction indicated by the arrows in FIG. 9.

The flow passages 62 through the turbine wheel are defined, in width, by the separation between adjacent buckets 54, and, in height, by the spacing between upper surface 64 of the turbine wheel and lower surface 66 of shroud 56. A passage throat 68 is defined in each passage 62 and the several flow passages 62 lead into a common supersonic expansion chamber 70. The buckets 54 have been shown with their trailing edges extending into expansion chamber 70, but, as discussed with respect to the previous embodiments, it will be understood that the buckets may terminate at the throat or may extend any desired distance into the common expansion chamber.

As has been discussed with respect to the previous embodiments relating to stationary nozzles, the embodiment of FIGS. 9 and 10 has a common expansion chamber; i.e., chamber 70, into which all of the buckets discharge. Thus, subsonic expansion takes place in the individual flow passages 62, in a direction substantially tangential with respect to a radius of a turbine wheel. However, the walls 64 and 66 which define common expansion chamber 70 are inclined with respect to a radius of a turbine wheel so as to define a radially expanding chamber wherein the supersonic expansion occurs in a direction which can be considered radial with respect to the turbine wheel. Of course, it will be understood that the common expansion chamber 70 is an annular chamber around the entire turbine wheel, only part of which has been shown in FIGS. 9 and 10.

This configuration wherein a vaneless supersonic expansion chamber is incorporated in a rotating turbine wheel is desirable to obtain a high horsepower output from a minimum number of wheels. The turbine wheel may be a pure reaction turbine having no stationary nozzles, as shown in FIGS. 9 and 10, or it may also be used in conjunction with a nozzle assembly of either the vaneless supersonic nozzle type of the present invention or a conventional prior art nozzle configuration. While both of walls 64 and 66 are shown diverging to form chamber 70, it will be understood, as discussed previously, that the radial divergence of chamber 70 can also be realized with only one of these walls inclined.

Figure 11:
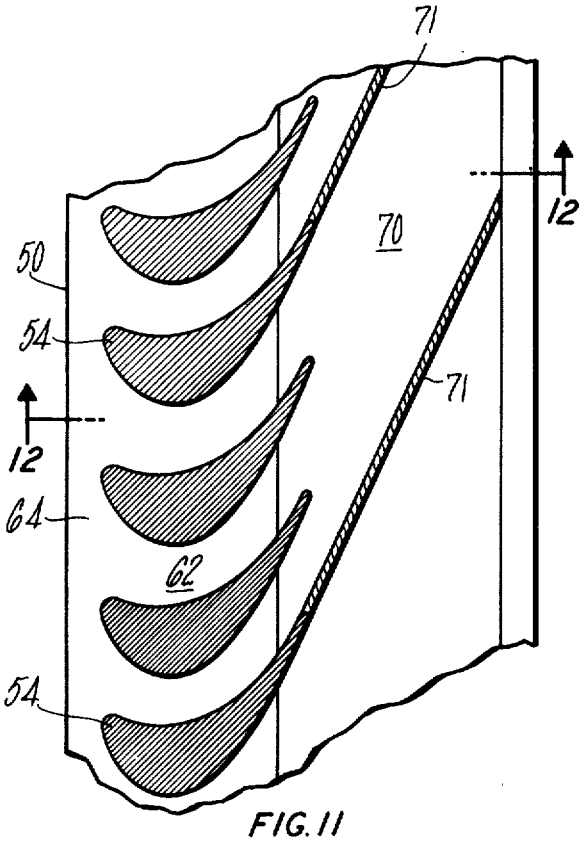
FIG. 11 is a view similar to FIG. 10 showing a plurality of backup walls.

Referring now to FIG. 11, a modification of FIG. 10 is shown wherein backup walls 71 are incorporated. These backup walls are comparable to the backup walls described above with regard to FIG. 6. The backup walls, which define vaneless supersonic expansion chambers therebetween, may be distributed periodically or aperiodically about the circumference of chamber 70, with the number of backup walls varying from as few as two for the entire circumference to as many as one for each two buckets. Two of the backup walls 70 are shown in FIG. 11 representative of an arrangement wherein a backup wall is positioned at every third nozzle. In that arrangement for backup walls, each two adjacent backup walls would define a common radially diverging expansion chamber for the three flow paths 62 contained therebetween.

Referring now to FIG. 12, an arrangement is shown wherein the blades 54 cooperate with a stationary shroud 72, the wall 74 of which cooperates with wall 64 to define the contour of the flow passage through the buckets and also to define the contour of the common supersonic expansion chamber 70. As can be seen in FIG. 12, and with reference to the direction of flow through the turbine, the left portion of wall 74 is inclined toward or converging with respect to wall 64, and the right portion of wall 74 is inclined away from or diverging with respect to wall 64. This converging-diverging shape of wall 74 can be used to define the throat 68 of the passageway at any desired point by adjusting the contour of wall 74 (or wall 64) to form the narrowest cross-sectional flow area of the passage at the desired location of the throat. Thus, by the modification shown in FIG. 12, which is similar to the modification discussed with respect to and illustrated in the dotted configuration of FIG. 8, the location of the throat of the bucket or nozzle, as the case may be, can be defined in the radial plane, i.e., radially with respect to the turbine wheel, by contouring either the top or bottom wall which defines the flow passage rather than by the contour of the side walls. Among other advantages, this modification affords the advantage that a large number of buckets or nozzles may, if desired, be arranged in an array with a smaller than usual spacing therebetween, and the additional necessary space for the flow passage volume can be obtained by the radial contouring of the converging part of the passage wherein the subsonic expansion takes place. The wall contouring aspects of FIGS. 8 and 12 with respect to contouring of the individual flow passages are more fully discussed and claimed in my copending Application Serial No. 362,402 filed contemporaneously herewith.

Figure 13:
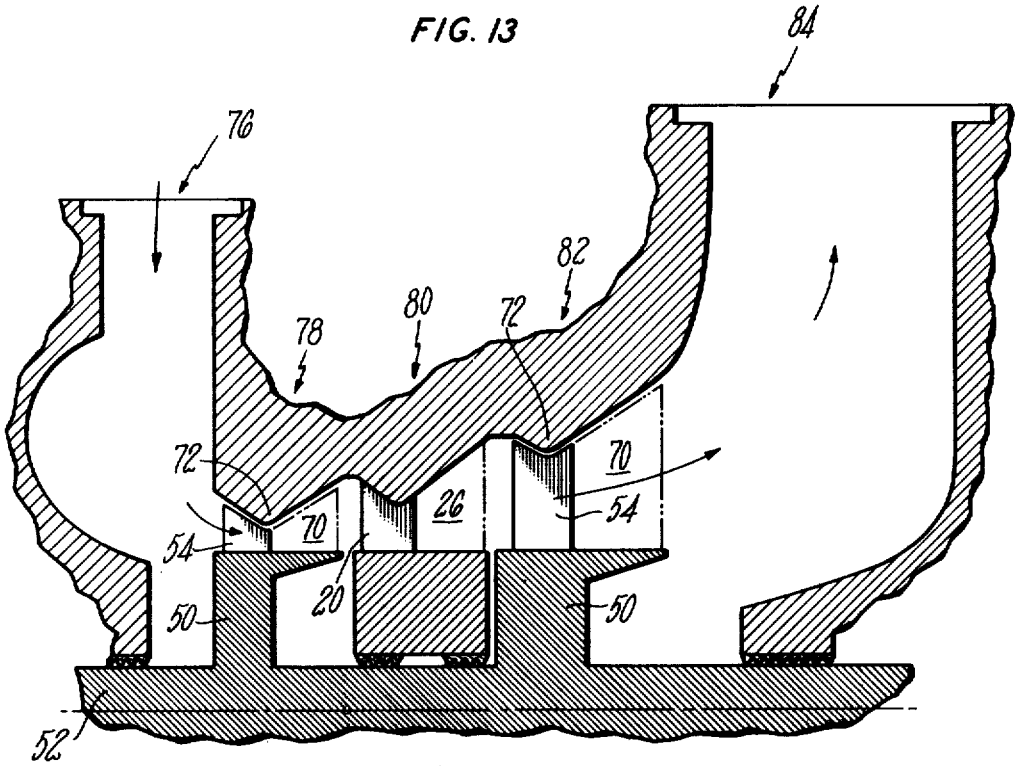
FIG. 13 is a view showing the present invention applied to the stationary nozzles and rotating buckets of a turbomachine.

Referring now to FIG. 13, an arrangement is shown, for purposes of illustration only, wherein the concepts of the present invention are shown in both the rotating and stationary stages of a turbomachinery unit in a highly efficient manner and for a very large pressure ratio, such as on the order of 1000:1. The turbomachinery unit of FIG. 13 has an inlet generally designated at 76, a first rotating stage 78, a stationary stage 80, a second rotating stage 82, and an exit 84. The rotating stages 78 and 82 may be of the type shown in FIG. 12 with turbine wheels 50 mounted on a common rotating shaft 52, each of the wheels carrying buckets 54 and cooperating with contoured shrouds 72 which serve to define the supersonic expansion passages 70 and which may if desired, also define the contour of the subsonic expansion passages. Between the two rotating stages stationary stage 80 has stationary nozzles 20 and the common supersonic expansion chamber 26. Backup walls may be included as indicated in the dotted lines.

In the arrangement shown in FIG. 13, a fluid entering inlet 76 at 1,000 psia can be expanded through rotating stage 78 to 100 psia, and can then be expanded through stationary stage 80 to 10 psia and can then be expanded through rotating stage 82 to 1 psia. Thus, a 10:1 expansion can be accommodated in each of three stages to accommodate an overall pressure ratio of 1,000:1, and this can be accomplished using only two rotating rows and one stationary row. Of course, it will be understood that the arrangement shown in FIG. 13 is for illustrative purposes only, and many other and varied arrangements can be accomplished depending on the design requirements for particular installations.

While the discussion herein has been directed to an axial machine; i.e., one in which the motive fluid flows through the turbine wheel in a generally axial direction, it should also be noted that the invention is equally applicable to a radial machine, i.e., one in which the motive fluid is delivered generally tangentially to the turbine wheel. In such an arrangement, for example, convergence could occur in a direction generally parallel to the turbine wheel and divergence could occur in a direction 90° removed and generally perpendicular to the wheel.

While a preferred embodiment has been shown and described, various modifications and substitutions may be made thereto without departing from the spirit and scope of the present invention. Accordingly, it may be seen that the present invention has been shown and described by way of illustration and not limitation.

What is claimed is:

1. A converging-diverging nozzle unit for a supersonic expansion of a motive fluid for delivery to a turbine wheel, the nozzle unit including:

a plurality of nozzles in an array with converging flow passages between adjacent nozzles in the array;

an entrance and a throat in each of said flow passages, the throat being downstream of the entrance in the direction of flow of motive fluid through the passage; and a common diverging expansion chamber connected to receive flow from said converging passages, said common diverging chamber extending from the vicinity of the throats of said converging passages downstream toward the turbine wheel.

2. A converging-diverging nozzle unit as in claim 1 wherein:

said common diverging expansion chamber diverges in a direction generally radial with respect to the turbine wheel.

3. A converging-diverging nozzle unit as in claim 2 wherein:

said converging flow passages converge at least partly in a direction at an angle with respect to the direction of divergence of said common diverging chamber.

4. A converging-diverging nozzle unit as in claim 3 wherein:

said converging flow passages converge in a direction generally tangential with respect to the turbine wheel.

5. A converging-diverging nozzle unit as in claim 3 wherein:

said angle between the direction of divergence of said diverging chamber and the direction of convergence of [said] *a* converging [chamber] *flow passage* is approximately 90°.

6. A converging-diverging nozzle unit as in claim 1 wherein:

adjacent nozzles extend downstream of the throat defined therebetween and extend into said common diverging chamber.

7. A converging-diverging nozzle unit as in claim 1 including:

at least one backup wall in said common expansion chamber.

8. A converging-diverging nozzle unit as in claim 7 wherein:

said backup wall is inclined at an angle to reduce the angle between the flow axis of a discharge stream from a flow passage and the exit plane of the passage upon an increase in the pressure ratio across the nozzle unit.

9. A converging-diverging nozzle unit as in claim 8 including:

a plurality of backup walls in said common expansion chamber, any two adjacent backup walls being spaced apart to include at least two flow passages therebetween.

10. A converging-diverging nozzle unit as in claim 1 wherein:

said passages in said nozzle converge in a first direction with respect to the turbine wheel; and said common diverging expansion chamber diverges in a second direction with respect to said turbine wheel and at an angle with respect to said first direction.

11. A converging-diverging nozzle unit as in claim 10 wherein:

said second direction is at an angle of approximately 90° with respect to said first direction.

12. A converging-diverging nozzle unit for supersonic expansion of a motive fluid for delivery to a turbine wheel, the nozzle unit including:

a plurality of nozzle means arranged in an arcuate array with converging flow passages defined between adjacent nozzle means for subsonic expansion of a motive fluid;

an entrance and a throat in each of said flow passages, the throat being downstream of the entrance in the direction of motive fluid flow through the passages; and common expansion chamber means between said array of nozzle means and the turbine wheel for supersonic expansion of motive fluid from said nozzle means and delivery to the turbine wheel, said common expansion chamber means having inner and outer arcuate walls spaced apart in a direction substantially radial with respect to the turbine wheel, at least one of said inner and outer arcuate walls being inclined away from the other along at least part of its length whereby said common expansion chamber diverges between said array of nozzle means and said turbine wheel.

13. A converging-diverging nozzle unit as in claim 12 wherein:

said converging flow passages converge at least partly in a direction at an angle with respect to the direction of divergence of said common diverging chamber.

14. A converging-diverging nozzle unit as in claim 13 wherein:

said converging flow passages converge in a direction generally perpendicular with respect to a radius of the turbine wheel.

15. A converging-diverging nozzle unit as in claim 13 wherein:

planes extending in the direction of divergence of said diverging chamber and the direction of convergence of [said] *a* converging [chamber] *flow passage* intersect at an angle of approximately 90°.

16. A converging-diverging nozzle unit as in claim 12 wherein:

adjacent nozzles extend downstream of the throat defined therebetween and extend into said common diverging chamber.

17. A converging-diverging nozzle unit as in claim 12 including:

at least one backup wall in said common expansion chamber.

18. A converging-diverging nozzle unit as in claim 17 wherein:

said backup wall is inclined at an angle to reduce the angle between the flow axis of a discharge stream from a flow passage and the exit plane of the passage upon an increase in the pressure ratio across the nozzle unit.

19. A converging-diverging nozzle unit as in claim 18 including:

a plurality of backup walls in said common expansion chamber, any two adjacent backup walls being spaced apart to include at least two flow passages therebetween.

*20. A converging-diverging passage unit about an axis of a turbine wheel for supersonic expansion of a motive fluid, the passage unit including:*

*a plurality of passage defining elements in an array with converging flow passages between adjacent elements in the array;*

*an entrance and a throat in each of said flow passages, the throat being downstream of the entrance in the direction of flow of motive fluid through the passage; and*

*a common diverging expansion chamber connected to receive flow from said converging passages, said common diverging chamber extending from the vicinity of the throats of said converging passages downstream in the direction of flow through the passage unit.*

*21. A converging-diverging passage unit as in claim 20 wherein:*

*said common diverging expansion chamber diverges in a direction generally radial with respect to the turbine wheel.*

*22. A converging-diverging passage unit as in claim 21 wherein:*

*said converging flow passages converge at least partly in a direction at an angle with respect to the direction of divergence of said common diverging chamber.*

*23. A converging-diverging passage unit as in claim 22 wherein:*

*said converging flow passages converge in a direction generally tangential with respect to the turbine wheel.*

*24. A converging-diverging passage unit as in claim 22 wherein:*

*said angle between the direction of divergence of said diverging chamber and the direction of convergence of a converging flow passage is approximately 90°.*

*25. A converging-diverging passage unit as in claim 26 wherein:*

*adjacent passage defining elements extend downstream of the throat defined therebetween and extend into said common diverging chamber.*

*26. A converging-diverging passage unit as in claim 20 including:*

*at least one backup wall in said common expansion chamber.*

*27. A converging-diverging passage unit as in claim 26 wherein:*

*said backup wall is inclined at an angle to reduce the angle between the flow axis of a discharge stream from a flow passage and the exit plane of the passage upon an increase in the pressure ratio across the passage unit.*

*28. A converging-diverging passage unit as in claim 27 including:*

*a plurality of backup walls in said common expansion chamber, any two adjacent backup walls being spaced apart to include at least two flow passages therebetween.*

*29. A converging-diverging passage unit as in claim 20 wherein:*

*said passage converge in a first direction with respect to the turbine wheel; and*

*said common diverging expansion chamber diverges in a second direction with respect to said turbine wheel and at an angle with respect to said first direction.*

*30. A converging-diverging passage unit as in claim 29 wherein:*

*said second direction is at angle of approximately 90° with respect to said first direction.*

*31. A converging-diverging passage unit about an axis of a turbine wheel for supersonic expansion of a motive fluid, the passage unit including:*

*a plurality of passage defining means arranged in an arcuate array with converging flow passages defined between adjacent passage defining means for subsonic expansion of a motive fluid;*

*an entrance and a throat in each of said flow passages, the throat being downstream of the entrance in the direction of motive fluid flow through the passages; and*

*common expansion chamber means downstream of said array of passage defining means for supersonic expansion of motive fluid from said passage defining means, said common expansion chamber means having inner and outer arcuate walls spaced apart in a direction substantially radial with respect to the*

*turbine wheel, at least one of said inner and outer arcuate walls being inclined away from the other along at least part of its length whereby said common expansion chamber diverges downstream of said array of passage defining means.*

*32. A converging-diverging passage unit as in claim 31 wherein:*

*said converging flow passages converge at least partly in a direction at an angle with respect to the direction of divergence of said common diverging chamber.*

*33. A converging-diverging passage unit as in claim 32 wherein:*

*said converging flow passages converge in a direction generally perpendicular with respect to a radius of the turbine wheel.*

*34. A converging-diverging passage unit as in claim 32 wherein:*

*planes extending in the direction of divergence of said diverging chamber and the direction of convergence of a converging flow passage intersect at an angle of approximately 90°.*

*35. A converging-diverging passage unit as in claim 31 wherein:*

*adjacent passage defining means extend downstream of the throat defined therebetween and extend into said common diverging chamber.*

*36. A converging-diverging passage unit as in claim 31 including:*

*at least one backup wall in said common expansion chamber.*

*37. A converging-diverging passage unit as in claim 36 wherein:*

*said backup wall is inclined at an angle to reduce the angle between the flow axis of a discharge stream from a flow passage and the exit plane of the passage upon an increase in the pressure ratio across the passage unit.*

*38. A converging-diverging passage unit as in claim 37 including:*

*a plurality of backup walls in said common expansion chamber, any two adjacent backup walls being spaced apart to include at least two flow passages therebetween.*

* * * * *